Patented Apr. 18, 1950

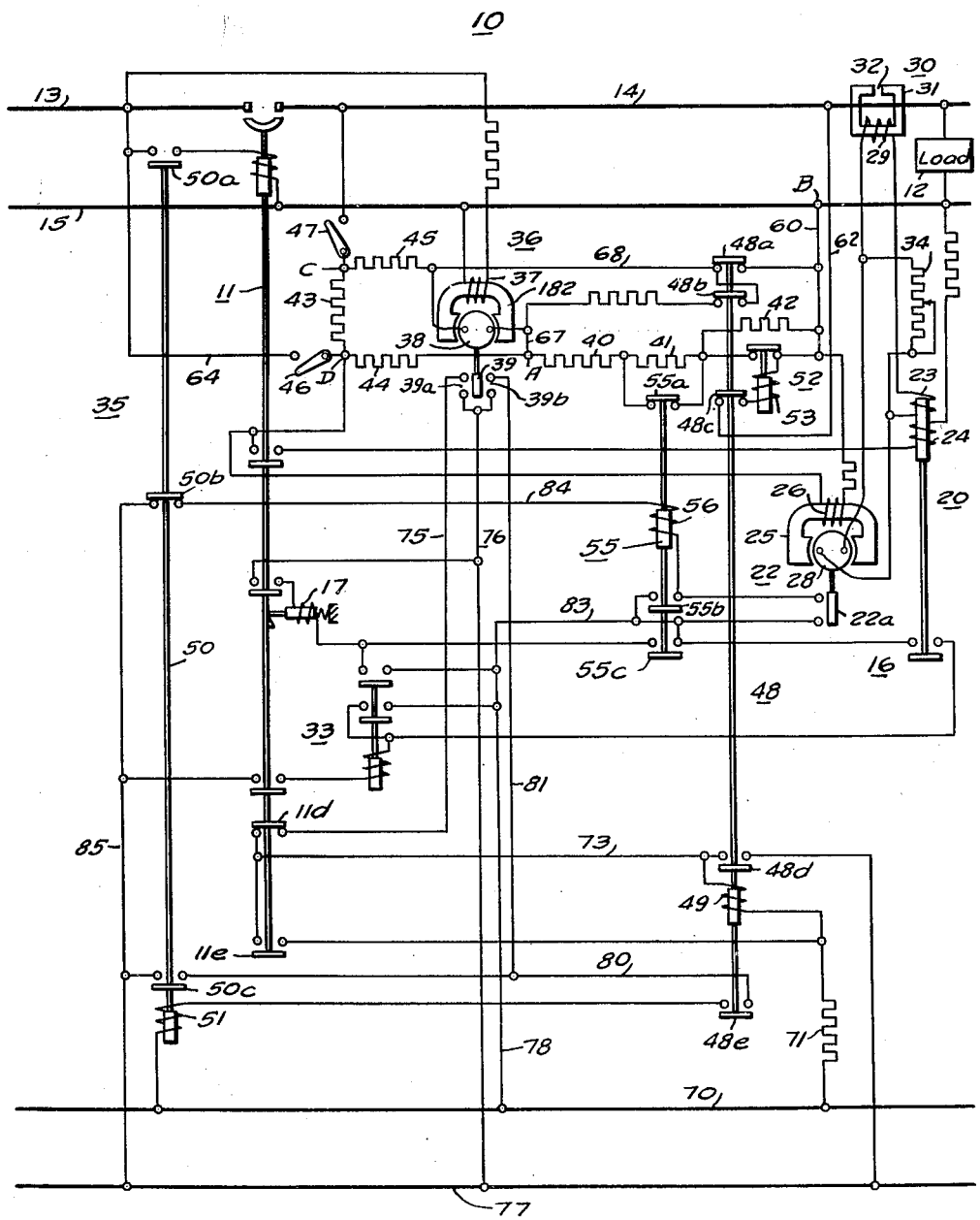

2,504,877

UNITED STATES PATENT OFFICE 2,504,877

CIRCUIT BREAKER CONTROL SYSTEM

Maurice E. Reagan, Pittsburgh, Pa., assignor to Westinghouse Electric Corporation, East Pittsburgh, Pa., a corporation of Pennsylvania Application July 17, 1947, Serial No. 761,521

5 Claims. (Cl. 175—294)

1

My invention relates, generally, to circuit-breaker control systems, and it has reference, in particular, to automatic reclosing systems for circuit breakers.

Generally stated, it is an object of my invention to provide an improved automatic reclosing system for circuit breakers, which is simple and inexpensive to manufacture, and is reliable and effective in operation.

More specifically, it is an object of my invention to provide, in a reclosing system for a circuit breaker, for distinguishing between remote and adjacent faults when reclosing the circuit breaker.

It is also an object of my invention to provide, in an automatic reclosing system for a circuit breaker, for recalibrating a load-measuring circuit which controls reclosing of the circuit breaker, depending upon whether the circuit breaker is opened in response to a remote fault or an adjacent fault.

Another object of my invention is to provide for reclosing a circuit breaker after an adjacent fault when the effective resistance of the load circuit indicates a resulting current of about the normal ampere rating of the circuit breaker, and when it indicates a lower value after a remote fault.

Yet another object of my invention is to provide, in an automatic reclosing system for a circuit breaker, for preventing reclosing on a remote fault which draws a relatively low value of current, without requiring a reduction in the value of resulting current for which the circuit breaker closes after an adjacent fault.

An important object of my invention is to provide, in an automatic reclosing system for circuit breakers, for recalibrating the load-circuit resistance-measuring means so as to prevent reclosing the circuit breaker on remote faults which draw no more than the normal load current, and yet may result in "pumping" the breaker.

Other objects will in part be obvious, and will in part be explained hereinafter.

In practicing my invention in one of its forms, a circuit breaker is provided with a quick-response fault relay for tripping the breaker in response to adjacent faults, and an inverse-time D'Arsonval-type fault relay for tripping it in response to remote faults. Reclosing of the breaker is effected by using a bridge-type reclosing circuit for measuring the resistance of the load circuit as soon as the breaker is opened, so as to determine if the current which would flow upon closing the circuit breaker would be of a safe

2 value. When the D'Arsonval-type fault relay operates, it indicates a remote fault so the bridge-type reclosing circuit is recalibrated to measure the load circuit for a remote fault condition which may actually draw a current of less than the normal load value. Should a remote fault exist, the recalibrated control circuit prevents reclosing of the circuit breaker, which might otherwise result in "pumping" the breaker.

For a more complete understanding of the nature and scope of my invention, reference may be made to the following detailed description which may be read in connection with the accompanying drawing, in which the single figure is a diagrammatic view of an automatic reclosing circuit-breaker system embodying the invention in one of its forms.

Referring to the drawing, the reference numeral 10 denotes generally an automatic reclosing system for a circuit breaker 11, which may be disposed to connect a load 12 to a direct current source of electrical energy through conductors 13, 14 and 15. The load 12 may also be energized from another source at the remote ends of the conductors 14 and 15.

In order to provide for tripping the circuit breaker 11 in response to predetermined fault conditions, protective control means represented generally by the numeral 16 may be provided for effecting energization of a trip winding 17 of the circuit breaker in response to fault conditions. The protective control means 16 may be of any suitable type and may, for example, comprise remote and adjacent fault-responsive means, such as disclosed in Patent No. 1,741,976, which issued on December 31, 1929, to C. A. Butcher.

The protective control means 16 may comprise a quick-response adjacent fault relay 20 and a relatively slow-acting remote fault relay 22. The quick-acting fault relay 20 may be of the solenoid-type, having an operating winding 23 and a polarizing or biasing winding 24. The slow-acting fault relay 22 may be of the D'Arsonval-type, having a magnetic core structure 25 with a polarizing winding 26 and a moving coil type operating winding 28 disposed to actuate a moving contact member 22a.

The operating windings 24 and 28 of the fault relays 20 and 22 may be energized from the load circuit by being connected in series-circuit relation with the secondary winding 29 of an impulse-type current transformer 30 which may be associated with the conductor 14 of the load circuit. The transformer 30 may comprise a magnetic core member 31 having an air gap 32 therein to prevent saturation of the core in response to the normal load current. Accordingly, the secondary winding 29 will only be energized in response to relatively abrupt changes in the load current, such as may, for example, be caused by fault conditions.

Because of its quick-response characteristics, the fault relay 20 may be disposed to operate substantially immediately in response to fault conditions. It may be so calibrated that it operates for such values of fault current as would only be produced by adjacent faults. An auxiliary relay 33 may be used in conjunction with the fault relay 20 for energizing the trip winding 17.

Because of the inverse time and ballistic characteristics of the D'Arsonval-type fault relay 22, it does not respond immediately even to relatively severe adjacent faults. By means of a control resistor 34, the fault relay 22 may be made to respond to fault currents resulting from remote faults, which currents may be of a lower value than the normal load current.

In order to provide for reclosing the circuit breaker 11 after it has been tripped, reclosing means 35 may be provided. The reclosing means may, for example, be of the Wheatstone-bridge load-circuit-measuring type, such as disclosed in Patent No. 1,632,983, which issued on June 21, 1947, to J. H. Procter. The reclosing means 35 may, for example, comprise a reclosing relay 36 having a polarizing winding 37 energized from the source conductors 13 and 15, and provided with a moving-coil type operating winding 38 for actuating a moving contact member 39 for selectively engaging stationary contact members 39a or 39b.

The operating winding 38 may be connected across a Wheatstone-bridge circuit A, B, C, D, comprising resistor 40 and recalibrating resistors 41, 42 in leg AB, the load 12 in leg BC, resistor 43 in leg CD, and resistor 44 in leg DA. The bridging connection AC includes the operating winding 38 and resistor 45. The resistor 43 may be connected between the conductors 13 and 14 of the load circuit through control switches 46 and 47. The point B is the negative terminal of the load and source, so that the bridge circuit is connected to the source at the points B and D.

An auxiliary reclosing relay 48 having an operating winding 49, may be used in conjunction with the reclosing relay 36 for controlling the connections of the reclosing relay and effecting operation of a circuit-breaker closing relay 50 having an operating winding 51.

Since the load 12 may be supplied with electrical energy from sources other than the source connected thereto through the circuit breaker 11, a voltage relay 52 having an operating winding 53 may be provided for recalibrating the Wheatstone-bridge circuit to determine the proper conditions for reclosing when the load 12 may be still connected to a source of electrical energy other than that to which connection is made through the circuit breaker 11. The operating winding 53 may be connected between the conductors 14 and 15 to determine whether a voltage exists across the load circuit when the circuit breaker 11 is open. The relay 52 may be utilized to normally shunt the recalibrating resistor 42, which will be connected into the Wheatstone-bridge circuit when the relay 52 operates.

In order to permit the circuit breaker 11 to be reclosed after an adjacent fault when the circuit conditions are such that the resulting current will be approximately of a normal value, and yet prevent reclosing of the breaker after opening because of a remote fault while the fault still exists and even though it may actualy draw less current through the circuit breaker 11 than the normal load value, a control relay 55 having an operating winding 56 may be utilized. The control relay 55 may be disposed to normally shunt the additional recalibrating resistor 41 in the leg AB of the Wheatstone-bridge circuit.

The operating winding 56 of the control relay may be connected for energization when the remote fault relay 22 operates, so as to recalibrate the bridge circuit when the circuit breaker is tripped in response to a remote fault condition. Accordingly, the value of current, for which the circuit breaker 11 may be reclosed after a remote fault occurs, may be set at a relatively low value, without penalizing the value of current for which the circuit breaker may be reclosed after an adjacent fault occurs.

With the circuit in the deenergizing condition as shown, and the circuit breaker 11 open, the operating winding 53 of the voltage relay 52 is connected across the load circuit through the circuit extending from the point B through conductor 60, operating winding 53, contact member 48c of the auxiliary reclosing relay 48, and conductor 62, to the conductor 14 of the source. Should a voltage exist across the load 12, the voltage relay 52 operates, and inserts the recalibrating resistor 42 into the bridge circuit, so that the measuring circuit is calibrated for measuring the effective resistance of the parallel-fed load circuit, including the voltage from some other source. If no voltage exists across the load 12, the recalibrating resistor 42 remains shunted, and the Wheatstone-bridge measuring circuit is calibrated for merely measuring the resistance of the stub feeder including the conductors 14 and 15 and the load 12.

With the control switches 46 and 47 in the closed position, the moving coil operating element 38 of the reclosing relay 36 is connected to the source conductors 13 and 15. This connection may be traced from the conductor 13 through conductor 64, control switch 46, control resistor 44, conductor 67, operating winding 38, conductor 68, contact member 48a of the auxiliary reclosing relay 48, and conductor 69, back to the conductor 15. The reclosing relay 36 actuates the moving contact member 39 after an interval of time to engage the stationary contact members 39a. An energizing circuit is thereby provided for the auxiliary reclosing relay 48, extending from the control conductor 70 through resistor 71, operating winding 49, conductor 73, contact member 11d of the circuit breaker, conductor 75, stationary contact members 39a and moving contact member 39, and conductor 76 back to the control conductor 77. A holding circuit for the relay 48 is provided through contact member 48d.

The auxiliary reclosing relay 48 operates, and removes the shunt from the moving coil element 38 by opening contact member 48b. Contact members 48a and 48c are also opened, so as to connect the moving coil element 38 in bridging relation in the bridge circuit, and to render the voltage relay 52 ineffective, respectively. Contact member 48e closes and sets up an operating circuit for the circuit breaker closing relay 50.

The reclosing means 35 now measures the effective resistance of the load circuit, and the reclosing relay 36 operates to bring the moving contact member 39 into engagement with the stationary contact members 39b if the resistance is of such a value that no more than normal load current will flow when the breaker is closed. An operating circuit is thereby completed for the circuit-breaker closing relay 50. This circuit may be traced from the control conductor 70 through operating winding 51, contact member 48e of the auxiliary reclosing relay 48, conductor 80, conductor 81, stationary contact members 39b and moving contact member 39, and conductor 76, back to the other control conductor 77.

The circuit-breaker closing relay 50 operates and completes a holding circuit for itself through contact members 50c. At the same time, an obvious energizing circuit is provided for the operating winding of the circuit breaker through contact member 50a. When the circuit breaker 11 closes, the auxiliary reclosing relay 48 is shunted down through contact members 11e of the circuit breaker. Accordingly, the relay 48 returns to the deenergized position and reconnects the shunt about the moving coil element 38, and removes the moving coil element from its bridging connection in the Wheatstone-bridge circuit. The circuit-breaker closing relay 50 is deenergized by the opening of contact member 48e.

When the circuit breaker 11 is closed, it may be tripped through operation of the quick response fault relay 20 in response to a nearby fault. Relay 20 energizes auxiliary relay 33 which in turn energizes the trip winding 17. As soon as the circuit breaker opens, the Wheatstone-bridge measuring circuit is connected as hereinbefore described, and the reclosing relay 36 determines whether or not the circuit breaker may be safely reclosed, depending upon whether the resultant current will exceed the normal load value.

Should the circuit breaker be tripped in response to operation of the remote fault relay 22, the control relay 55 is energized through a circuit which extends from the control conductor 70 through conductor 78, conductor 83, moving contact member 22a of the fault relay 22, operating winding 56 of the control relay, conductor 84, contact member 50b, and conductor 85, back to the control conductor 77.

The control relay 55 operates, closing contact member 55c to provide an energizing circuit for the trip winding 17 so as to open the circuit breaker. At the same time, it opens contact member 55a so as to insert the additional recalibrating resistor 41 into the Wheatstone-bridge circuit, and it provides a holding circuit through contact members 55b. Accordingly, the Wheatstone-bridge circuit is recalibrated to effect operation of the reclosing relay, only if the resultant current upon closure of the circuit breaker 11 is such to indicate that a remote fault no longer exists. (This value may be somewhat lower than the normal value of load current.) Should the reclosing relay 36 indicate that it is safe to reclose the circuit breaker, this procedure takes place substantially as described hereinbefore.

From the above description and the accompanying drawing, it will be apparent that I have provided for recalibrating the load-measuring circuit in an automatic reclosing circuit-breaker system, so as to permit reclosing the circuit breaker after an adjacent fault when the bridge circuit indicates that the resultant current will be of substantially the normal load value. At the same time, provision is made for preventing reclosing of the circuit breaker after a remote fault, should the remote fault continue to exist, even though the resultant current may be less than the normal load value. A reclosing system embodying the features of my invention provides for reclosing the circuit breaker under all proper conditions, and prevents "pumping" of the circuit breaker because of reclosing on an existing remote fault which may draw a relatively low value of current and yet cause the protective means to repeatedly operate to trip the circuit breaker as soon as it is reclosed.

Since certain changes may be made in the above-described construction and different embodiments of the invention may be made without departing from the spirit and scope thereof, it is intended that all the matter contained in the above description and shown in the accompanying drawing shall be considered as illustrative and not in a limiting sense.

I claim as my invention:

1. A reclosing system for a circuit breaker disposed to be tripped in response to a fault condition in a circuit comprising, fault responsive means operable to trip the breaker in response to a nearby fault, additional fault responsive means operable to trip the breaker in response to a remote fault, reclosing means operable to reclose the circuit breaker, control means operable to check an electrical characteristic of the circuit and effect operation of the reclosing means unless a fault condition exists, and recalibrating means selectively operable in response to operation of said additional fault responsive means to recalibrate the control means before it checks the circuit.

2. In a control system for a circuit breaker disposed to connect a load circuit to a source of electrical energy, protective means operable to trip the circuit breaker including a relay responsive to the average rate of change of current in the load circuit and a relay responsive to both the average rate of change and the duration of such change, reclosing means operable to reclose the circuit breaker including a bridge circuit disposed to measure the effective impedance of the load circuit, and control means selectively operable in response to operation of one of the protective relays to recalibrate the bridge circuit for effecting operation of the reclosing means in response to different values of effective impedance when the fault is near and remote.

3. In a control system for a circuit breaker disposed to connect a load circuit to a source of electrical energy, protective means operable to open the circuit breaker, said protective means including an impulse transformer and a pair of fault means energized therefrom so as to be selectively responsive to remote and nearby faults, circuit means operable to reclose the circuit breaker including a bridge-type load-circuit-measuring system, and control means selectively responsive to operation of the fault means responsive to remote faults operable to calibrate said measuring system for closing on a lower value of fault current when the fault is remote.

4. A reclosing system for a circuit breaker disposed to connect a load to a source of electrical energy comprising, an impulse transformer connected in circuit relation with the load, protective means operable to trip the circuit breaker including a solenoid relay and a ballistic relay energized from the impulse transformer, reclosing means operable to reclose the circuit breaker, circuit means including a bridge-type measuring circuit having the load circuit as one leg connected to control operation of the reclosing means, and relay means connected for energization in response to operation of the ballistic relay, said relay means being operable to vary the impedance of the bridge-type measuring circuit and require a higher effective impedance measurement for reclosing when the circuit breaker is opened in response to operation of the ballistic relay.

5. A control system for a circuit breaker disposed to connect a load circuit to a source of direct current comprising, an impulse transformer connected in circuit relation with the load circuit, protective means including relay means responsive to adjacent faults and additional relay means responsive to remote faults, said relay means and additional relay means being individually operable to trip the circuit breaker, a bridge-type measuring circuit including the load circuit in one leg thereof, reclosing means for the circuit breaker controlled by the measuring circuit, a control relay responsive to operation of the remote fault-responsive relay means and operable to recalibrate the measuring circuit to prevent reclosing the circuit breaker on a remote fault approximating the normal load value amperes of the circuit breaker, and additional control means responsive to the voltage of the load circuit operable to recalibrate the measuring circuit to compensate for the voltage on the circuit.

MAURICE E. REAGAN.

REFERENCES CITED

The following references are of record in the file of this patent:

UNITED STATES PATENTS

| Number | Name | Date |
|---|---|---|
| 2,214,866 | Warrington | Sept. 17, 1940 |
| 2,249,870 | Taliaferro | July 22, 1941 |
| 2,385,042 | Taliaferro | Sept. 18, 1945 |